(No Model.)
G. W. KNAPP.
CAR COUPLING.
No. 280,381. Patented July 3, 1883.
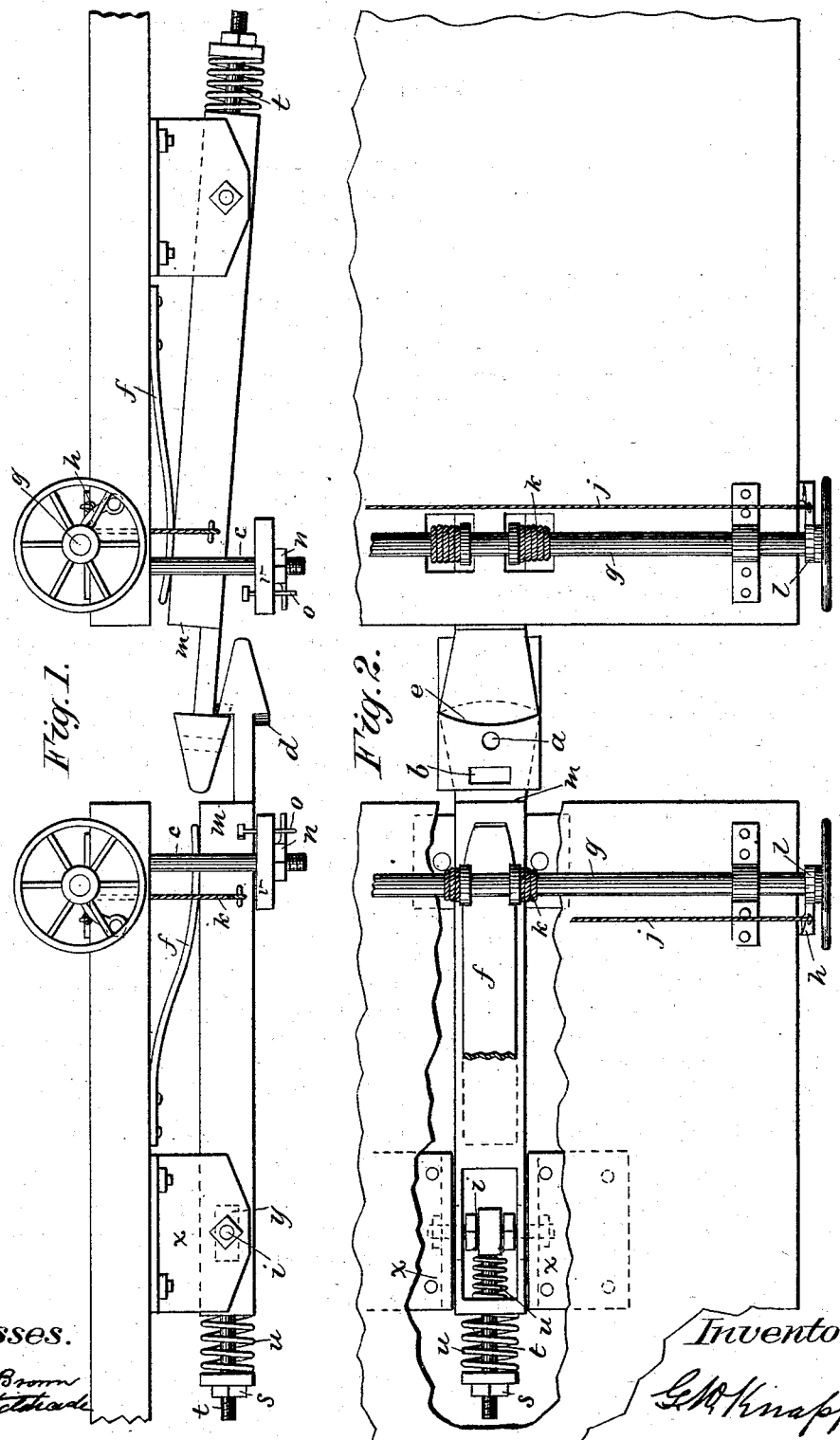
Witnesses.
Daniel F. Brown
George Welstead
Inventor.
G. W. Knapp

UNITED STATES PATENT OFFICE.

GEORGE W. KNAPP, OF CORNING, NEW YORK.

CAR-COUPLING.

SPECIFICATION forming part of Letters Patent No. 280,381, dated July 3, 1883.

Application filed December 13, 1882. (No model.)

*To all whom it may concern:*

Be it known that I, GEORGE W. KNAPP, of Corning, in the county of Steuben, and in the State of New York, have invented certain new and useful Improvements in Railroad - Car Couplers and Buffers; and I do hereby declare that the following is a full, clear, and exact description thereof, reference being had to the accompanying drawings, forming a part of this specification.

My invention relates to that class of car-couplers known as "automatic." The link and pin are dispensed with, but still can be used when necessary to connect with the old style. A buffer is combined with the draw-bar, which is hung by means of a noddle-pin and adjustable yoke, adapting it to coupling cars of different heights, uncoupling being effected without going between the cars.

Figure 1 of the accompanying drawings is a side elevation. Fig. 2 is a plan or top view.

The heavy plates $x$, Fig. 1, and $x\ x$, Fig. 2, are firmly bolted to the timbers or bottom of the car. Between these plates the draw-bar is fastened by means of the noddle-pin $i$ and the spring-bar $t$. The noddle-pin passes through elongated apertures in the sides of the draw-bar $y$, allowing a little play. The spring-bar passes through a round hole in the end of the draw-bar, which is placed between two heavy coiled springs, $u\ u$, on the spring-bar, the springs receiving and breaking the dead jerk or shock. The noddle-pin passes through the elongated head of the spring-bar, both that and the draw-bar being pivoted at the same point, allowing the draw-head or coupler to be raised or lowered at pleasure. The springs are secured upon the spring-bar by a key or the tightening-nut $s$. The noddle-pin is fastened in a similar manner. A spring, $f$, of such strength as necessary, is attached to the bottom of the car, the free end resting on the top of the draw-bar, preventing the draw-heads jumping up and uncoupling. The nut $n$ has a shank or handle, so as to be readily turned without a wrench, and rides upon strong rods $c$, Fig. 1, projecting downward at the end of the car, the lower ends of the rods passing through a heavy plate, $v$, Fig. 1, forming an adjustable yoke for the support of the draw-bar, and allowing cars of different heights to be connected by securing coupling-centers of uniform height. The thread on the rods should extend upward far enough to allow the plate to be raised as high as required. The key $o$ should be placed in the yoke-plate, so that the handle or shank of the nut $n$ will strike against it and prevent the nut from working off by jarring. The lower end of the key should be turned at right angles to prevent losing, and at the same time allow the nut to turn when the arm of the key is drawn up to the plate. The raised shoulder $m$ on the draw-bar operates as a buffer, the end of the opposite draw-head striking against it, breaking the shock by means of the spring against which the inner end of the draw-bar rests. The outer ends of the draw-bars or draw-heads are in nearly the form of very broad blunt wedges attached to the connecting portion of the draw-bar at the center of the wedge-head, much the same as an arrow-head is attached to its shaft, as represented in Fig. 1. The projecting portions of the wedge-heads, or those portions which interlock when coupled, should be inclined under or hooking to prevent slipping off and uncoupling by the strain of drawing. The upward projection or hook has a concave drawing-surface, $e$, Fig. 2. The downward one is convex ($d$, Fig. 1) and on a smaller circle than the concave, into which it locks. These peculiar forms cause them to draw toward the center and prevent uncoupling in passing curves, at the same time allowing them to uncouple readily when thrown from the track, and with the width of the draw-heads insure coupling when the draw-heads do not strike squarely together.

In practical operation one of the draw-heads is adjusted so that it will ride over the other when the cars come together, and become interlocked or coupled as soon as the spring-pressure and gravity can force them together. Thus, when the draw-bars are of the same height, to not have the car to be hitched onto knocked back, and insure certainty of action, one of the draw-bars should be dropped down a couple of inches or so; and when there is too great difference in height to couple without, the low draw-bar should be raised up and the higher-one lowered, so as to bring them into proper position for coupling; but when there is only a moderate difference in the height no adjusting is necessary.

In the upper side of the outer end of the draw-head is an elongated aperture or mortise, b, Fig. 2, for the insertion of a link, so as to allow the old link-coupler to connect with new form, a, Fig. 2, being a vertical hole through the draw-head, into which a pin is inserted through and holding the link.

The uncoupling apparatus consists of chains k, Fig. 1, attached to each side of the draw-bar, which wind round (k k, Fig. 2) a small iron shaft, g, Fig. 2, passing across the end of the car, either above the frame, as represented in the drawings, or beneath it, if more desirable, on the projecting ends of which shaft, at the corners of the car, are hand-wheels or cranks for turning the same. Ratchet-wheels l l, Fig. 2, are placed on the shafts inside of the hand-wheels or cranks, into which ratchets or pawls are dropped to hold the draw-heads up when uncoupled and keep them in position to not couple when desirable. A cord or chain, j j, Fig. 2, is attached to the ratchets or pawls, enabling the operator to loosen them from the opposite side of the car.

The foregoing is more particularly adapted to freight-cars. For passenger-coaches (or to uncouple box-cars from the top) the chains may pass over pulleys and wind round a vertical shaft, similar to the manner in which the brakes are applied; or they may be uncoupled by means of an upright lever pivoted in the end of the car, about midway between the draw-bar and the side of the car, with an arm projecting from the lower end, so as to be attached or pass under the draw-bar.

It is obvious that some portions of my invention can be used without the others. For instance, the method of hanging the draw-bar by means of the noddle-pin and its concomitants, with the adjustable yoke, (which secure coupling-centers of uniform height,) can be used in connection with other forms of draw-heads. The buffer-shoulder, with its concomitants, can be left out, if desirable; or the spring f can be omitted if not needed or a substitute is desirable; or but one chain need connect the draw-bar and uncoupling-shaft, to be attached to the top of the draw-bar.

Having thus fully described the construction of my invention and its operation, what I claim as new, and desire to secure by Letters Patent, is—

1. The draw-bar constructed with a recess near the inner end to receive the spring-bar t and one of the springs u, with slots in the sides at sufficient distance from the end for the noddle-pin i, and a hole in the inner end to slide on the spring-bar t between the springs u u, allowing the bar longitudinal motion and vertical motion of the outer end.

2. The spring-bar t, constructed with an elongated perforated head, allowing it to be pivoted and work on the noddle-pin the same as the draw-bar, and affording room in the recess of the draw-bar for one of the springs u to work without friction, the whole operating as shown in the drawings.

3. The combination by which the draw-bar is attached to the car, consisting of the plates x x, Fig. 2, the noddle-pin i, the spring-bar t, the springs u u, and the bar, all constructed substantially as described, and for the purposes set forth.

4. The rods c, the plate v, the nuts n, and the keys o, all constructed substantially as described, and for the purposes set forth.

5. The combination forming the adjustable supporting-yoke, consisting of the supporting-rods c, the plate v, the nuts n, and the keys o, substantially as described, and for the purposes set forth.

6. The uncoupling apparatus consisting of the combination, with the draw-bar, of the chains k k, shaft g, hand and ratchet wheels l l, Fig. 2, with the ratchets h h, and the ratchet cord or chain j, or their equivalents.

GEORGE W. KNAPP.

Witnesses:
DANIEL F. BROWN,
GEORGE HITCHCOCK.